United States Patent [19]
Van Den Heuvel et al.

[11] Patent Number: 5,618,480

[45] Date of Patent: Apr. 8, 1997

[54] PROCESS OF MAKING MULTIFILAMENT YARN, MONOFILAMENT OR FILM OF POLYETHYLENE NAPHTHALATE

[75] Inventors: Christiaan J. M. Van Den Heuvel, Ellecom; Anton P. De Weijer, Nijmegen; Hendrik Middeljans, Dieren; Herman M. Heuvel, Rheden, all of Netherlands

[73] Assignee: Akzo Nobel N.V., Arnhem, Netherlands

[21] Appl. No.: 483,267

[22] Filed: Jun. 7, 1995

Related U.S. Application Data

[62] Division of Ser. No. 262,549, Jun. 20, 1994, Pat. No. 5,466,525.

[30] Foreign Application Priority Data

Jun. 22, 1993 [DE] Germany .......................... 43 20 593.3

[51] Int. Cl.[6] .............................. D01D 5/088; D01F 6/62
[52] U.S. Cl. .................. 264/103; 264/210.1; 264/210.8; 264/211.12; 264/211.13; 264/211.14
[58] Field of Search ................................. 264/103, 210.1, 264/210.8, 211.12, 211.13, 211.14

[56] References Cited

U.S. PATENT DOCUMENTS

| 3,616,832 | 11/1971 | Shima et al. . |
|---|---|---|
| 3,929,180 | 12/1975 | Kawase et al. . |
| 4,000,239 | 12/1976 | Hamana et al. . |
| 4,001,479 | 1/1977 | Hamana et al. . |
| 4,026,973 | 5/1977 | Shima et al. . |
| 4,725,472 | 2/1988 | Okabe et al. . |
| 5,217,762 | 6/1993 | Frank . |

FOREIGN PATENT DOCUMENTS

| 532172 | 3/1993 | European Pat. Off. . |
|---|---|---|
| 536602 | 4/1993 | European Pat. Off. . |
| 546184 | 6/1993 | European Pat. Off. . |
| 1964514 | 8/1970 | Germany . |
| 2218137 | 11/1972 | Germany . |
| 2139854 | 2/1973 | Germany . |
| 2260778 | 7/1973 | Germany . |
| 2264819 | 3/1975 | Germany . |
| 2352570 | 4/1975 | Germany . |
| 2445035 | 4/1975 | Germany . |
| 1325107 | 8/1973 | United Kingdom . |
| 1445464 | 8/1976 | United Kingdom . |
| 1450491 | 9/1976 | United Kingdom . |
| WO93/14252 | 7/1993 | WIPO . |

OTHER PUBLICATIONS

Wulfhorst, Burkhard; Olbrich, Andreas; "Ein neu entwickeltes Gerat fur die Zugprufung von Garnen mit hohen Verformungsgeschwindigkeiten"; Textil Praxis International, Apr. 1993, pp. 281–284.

Winkler, Friedrich; u.a.: "Dichtebestimmung an Faserstoffen"; Faserforschung und Textiltechnik 18, 1967, pp. 529–533.

Derwent Abstract 88–336128/47 (Sep. 20, 1988).
Derwent Abstract 88–336131/47 (Sep. 20, 1988).
Abstract of Japan 4–352, 811 (Published Dec. 7, 1992).

*Primary Examiner*—Leo B. Tentoni
*Attorney, Agent, or Firm*—Oliff & Berridge

[57] ABSTRACT

Multifilament yarn, monofilament, or film, formed at least substantially of polyethylene naphthalate, has a strength of at least 400 MN/tex and a DSC melting point of at least 292° C., where the DSC melting point is measured on a sample quantity of 2.5 mg at a heating rate of 20° C. per min. For production, melted polyethylene naphthalate is extruded from a multi-hole spinneret, the filaments or film, solidified by cooling, are/is withdrawn at a rate of 500 to 10,000 m/min, where the filaments or film are/is subjected to a draw-down B of 40 to 25,000 from the spinneret output to the first withdrawal element. The polymer used may contain at least 85% by weight polyethylene naphthalate and have a melt flow index of 3 to 26.

12 Claims, No Drawings

PROCESS OF MAKING MULTIFILAMENT YARN, MONOFILAMENT OR FILM OF POLYETHYLENE NAPHTHALATE

This is a division of application No. 08/262,549 filed Jun. 20, 1994 now U.S. Pat. No. 5,466,525.

FIELD OF THE INVENTION

The invention relates to a multifilament yarn, a monofilament, or a film, consisting at least substantially of polyethylene naphthalate, as well as a method for producing yarns of this type.

BACKGROUND

Such a yarn is known from DE-A-22 60 778, for example. The yarn described exhibits a melting point of at least 275° C. The maximum achievable DSC melting point, measured on a sample quantity of 8.5 mg at a heating rate of 10° C. per min, is according to DE-A-22 60 778 as high as 291.7° C. This DSC melting point corresponds to a DSC melting point of 291° C. measured on a sample quantity of 2.5 mg at a heating rate of 20° C. per min. The examples demonstrate that the increase in melting point clearly is causally related to the increase in spinning speed. To achieve the previously cited highest melting point in accordance with example 15, a spinning speed of 8,000 m/min is required. At the practically achievable spinning speeds for technical yarns of at most 6,000 m/min, the DSC melting points according to DE-A-22 60 778 lie below 290° C. (2.5 mg; 20° C./min), corresponding to 290.5° C. (8.5 mg; 10° C./min). DE-A-22 60 778 thus describes only yarns for technical application with a melting point of 275° to 290° C.

In DE-A-21 39 854, a method is described for subsequently imparting to yarns which have been spooled after spinning a higher melting point in excess of 285° C. In this case, too, despite the very costly method, only DSC melting points under 290° C. are achievable. The values given in Table II of 290.3°, 292.0°, and 290.3° C. at constant length correspond to DSC melting points significantly below 290° C., as can easily be derived from Table I of DE-A-22 60 778, in which the corresponding values for DSC melting point and DSC melting point at constant length are given.

SUMMARY OF THE INVENTION

An object of the present invention is to provide multifilament yarns, monofilaments, or films consisting at least substantially of polyethylene naphthalate and highly suited to technical applications in particular. It is also an object of the present invention to provide a method for producing such yarns, filaments, or films that is convincingly uncomplicated.

These and other objects are achieved with a multifilament yarn, monofilament, or film at least substantially of polyethylene naphthalate, with a tearing strength of at least 400 mN/tex, in that it has a DSC melting point of at least 292° C., whereby the DSC melting point is measured on a sample quantity of 2.5 mg at a heating rate of 20° C. per min. In this process, the melt peaks of the yarns are determined with a Perkin Elmer DSC-7 differential scanning calorimeter calibrated with indium (melting point 156.6° C.) and zinc (melting point 419.5° C.). A crucible with 2.5 mg of a yarn sample is then heated at a rate of 20° C. per min, whereby the difference in heat flow between this crucible and an empty reference crucible is recorded as a thermogram.

As previously described in detail, a yarn with such a high DSC melting point has not been derivable in the art. It must therefore seem surprising that such a yarn can exist at all. The yarns according to the invention exhibit an excellent combination of high thermal stability and high dimensional stability and are thus particularly suited as reinforcing material in roofing or elastomers, or for producing tire cords, air bag fabrics, filter materials, and storage battery walls. They are also excellently suited for use in floor stabilizing fabrics.

DETAILED DESCRIPTION OF PREFERRED EMBODIMENTS

A multifilament yarn, monofilament, or film consisting at least substantially of polyethylene naphthalate are understood to be those yarns, filaments or films in which the filaments or films consist of a polymer which consists of at least 85% by weight, preferably at least up to 95% by weight, polyethylene naphthalate and/or whose filaments or films comprise at least two discreet polymers, of which polyethylene naphthalate comprises at least 70% by weight of the total weight of all polymers in the filament or film, such as bicomponent filaments or films, and/or of which the predominant number of filaments consist of polyethylene naphthalate. Polyethylene-2,6-naphthalate is preferred as the polyethylene naphthalate. Sample polymer additives include conventional additives used in melt spinning such as whiteners, revivers, or the like. The polymer can contain other monomers such as ester forming additives—which can be copolymerized with the polyethylene naphthalate units—for example, glycols such as diethylene glycol, trimethylene glycol, tetramethylene glycol, hexamethylene glycol, terephthalic acid, isophthalic acid, hexahydroterephthalic acid, dibenzoic acid, salicylic acid, adipinic acid, sebacic acid, and azelaic acid.

The multifilament yarn, monofilament, or film according to the invention is characterized in particular by a DSC melting point of 292° to 312° C.

Normally, the multifilament yarn, monofilament, or film according to the invention exhibits a hot-air shrinkage of less than 3.5%, measured after heating for 15 min at 190° C.

The hot-air shrinkage is determined as follows: the yarns are conditioned at 21° C. and 65% relative humidity. Yarn samples with an initial length of about 500 mm at a load of 5 mN/tex are subjected without tension to a temperature of 190° C. for 15 minutes. The hot-air shrinkage is the relative change in length (at 5 mN/tex) of the yarn after the treated yarn has again been conditioned at 21° C. and 65% relative humidity.

In determining a value, measurements from 3 yarn samples are used.

The multifilament yarn, monofilament, or film according to the invention is suited for technical applications such as reinforcing pneumatic vehicle tires when it exhibits a dimensional stability exceeding 120, whereby the dimensional stability is the ratio of the tearing strength of the yarn at 2% elongation in mN/tex to the hot-air shrinkage of the yarn in %.

In additional embodiments, the multifilament yarn, monofilament, or film according to the invention is characterized by the following properties:

it has a density exceeding 1,350 kg/m$^3$, preferably exceeding 1,362 kg/m$^3$, it has a DSC melting point of at least 295° C., preferably at least 300° C., its hot-air shrinkage, measured after heating for 15 min at 190° C., is less than 2.5%, preferably less than 1.6%, it has a dimensional stability of at least 150, preferably at least 200, it is drawn.

In a method for producing the multifilament yarn, monofilament, or film according to the invention, melted polyethylene naphthalate is extruded from an extrusion device such as, for example, a multi-hole spinneret, the filaments or extruded film, solidified by cooling, are/is withdrawn at a rate of 500 to 10,000 m/min, and the filaments or film are subjected to a draw-down B of 40 to 25,000 m/min from the extrusion device output to the first withdrawal element, an object of the invention is satisfied by using a polymer containing at least 85% by weight polyethylene naphthalate and exhibiting a melt flow index C of 3 to 26. Of course, care must be taken to ensure minimum polymer decomposition prior to the spinneret.

The draw-down is defined as the ratio of spinning speed, i.e., the speed imparted to the filament or film with the first drive aggregate, to the emergence speed of the melt from the spinneret. The emergence speed v in m/min is calculated as the throughput per spinneret hole $\Phi$ in g/min, the assumed density of the polymer melt of $\delta = 1,180$ kg/m³, and the spinneret hole diameter D in µm, as follows:

$$v = \frac{4 \; 10^9 \; \Phi}{\pi \; \delta \; D^2}$$

The melt flow index C is determined as follows: granules are dried in a tumble dryer for 8 hours at 150° C. and under high vacuum. To determine the melt flow index, a Zwick Fliess type 4105 tester is employed, into which a vertical tube 9.55 mm in diameter and 162 mm in length is inserted, the lower end of which has a nozzle channel 2.095 mm in diameter and 8 mm long. The tube is heated to 310° C. and maintained at this temperature. After 15 minutes, the tube is quickly and completely filled with the dried granules, to which a piston is then applied. After 4 minutes, the piston is subjected to a load of 2,160 g, such that the melt produced from the granules is expressed from the nozzle channel. The quantity output between the 5th and 6th minute is measured.

The melt flow index is the average value of three measurements of the respective quantity output between the 5th and 6th minute in each case, converted to g/10 min.

The method according to the invention is particularly effective when the polymer used is spun at a temperature T, whereby the following holds as a function of the melt flow index C:

$$100e^{-0.46C} + 300 \leq T \leq 100e^{-0.46C} + 325,$$

preferably:

$$100e^{-0.46C} + 305 \leq T \leq 100e^{-0.46C} + 318.$$

The increase in the melting point of the spun multifilament yarn, the monofilaments, or the film is especially effective when the filaments or films extruded from the spinneret are blown with a fluid maintained between 10° and 35° C., at a flow rate of 0.1 to 1.0 cm/sec. Blowing can be either lateral or via a radial air stream from the inside out or from the outside in. Good results are obtained when the filaments extruded from the spinneret or the extruded film are/is blown with a fluid maintained between 12° and 25° C., whereby an air flow rate of 0.2 to 0.6 m/sec has proven highly satisfactory.

Preferably, the polyethylene naphthalate has a melt flow index C between 6 and 20, the filaments or film, solidified via cooling, are/is withdrawn at a rate A of 500 to 8,000 m/min, and the filaments or film are/is subjected to a draw-down B of 100 to 10,000 from the spinneret output up to the first withdrawal element.

Preferably, the method uses a polyethylene naphthalate with a melt flow index C of 7 to 15 in which the filaments or film solidified via cooling are/is withdrawn at a rate A between 2,000 and 5,500 m/min and the filaments or film are/is subjected to a draw-down B of 500 to 8,000 from the spinneret output to the first withdrawal element. A withdrawal rate of 3,500 to 5,000 m/min has proven highly satisfactory.

The method according to the invention is particularly effective when withdrawal rate A, draw-down B, and melt flow index C are selected such that $\Phi > 1.15$, preferably $\Phi > 1.25$, whereby $$\Phi = \left[ \frac{2.5}{1 + e^{(-0.6*(\Psi + O_5))}} \right]$$

and $$\Psi = \frac{W_{13}}{1 + e^{-0.6*[W_1*[\frac{(A-500)}{9500} *2-1] + W_2*[\frac{(B-40)}{29460} *2-1] + W_3*[\frac{(C-5)}{15} *2-1] + O_1]}} +$$

$$\frac{W_{14}}{1 + e^{-0.6*[W_4*[\frac{(A-500)}{9500} *2-1] + W_5*[\frac{(B-40)}{29460} *2-1] + W_6*[\frac{(C-5)}{15} *2-1] + O_2]}} +$$

$$\frac{W_{15}}{1 + e^{-0.6*[W_7*[\frac{(A-500)}{9500} *2-1] + W_8*[\frac{(B-40)}{29460} *2-1] + W_9*[\frac{(C-5)}{15} *2-1] + O_3]}} +$$

$$\frac{W_{16}}{1 + e^{-0.6*[W_{10}*[\frac{(A-500)}{9500} *2-1] + W_{11}*[\frac{(B-40)}{29460} *2-1] + W_{12}*[\frac{(C-5)}{15} *2-1] + O_4]}}$$

and

-continued

| | | |
|---|---|---|
| $W_1 =$ 3.62416 | $W_2 =$ −66.57265 | $W_3 =$ −0.36305 |
| $O_1 =$ −65.2267 | $W_4 =$ −5.51435 | $W_5 =$ −15.02366 |
| $W_6 =$ −0.00704 | $O_2 =$ −22.71156 | $W_7 =$ 4.60509 |
| $W_8 =$ −33.08694 | $W_9 =$ −0.83813 | $O_3 =$ −37.28374 |
| $W_{10} =$ 43.44371 | $W_{11} =$ 5.26325 | $W_{12} =$ −5.66574 |
| $O_4 =$ 29.64359 | $W_{13} =$ −7.37680 | $W_{14} =$ 7.17561 |
| $W_{15} =$ 9.89252 | $W_{16} =$ 3.02096 | $O_5 =$ −1.59320 |

EXAMPLES

The invention will be described in more detail in the following examples.

Polyethylene naphthalate is prepared in a 200 l standard autoclave for polyester. A mixture of dimethyl-2,6-naphthalene dicarboxylic acid ester (48 kg) and ethylene glycol (32 kg) is transesterified using manganese diacetate ·4H$_2$0 (340 ppm), yielding polyethylene naphthalate oligomer. After transesterification is completed at about 230° C., a phosphorus stabilizer and antimonous trioxide as polycondensation catalyst (250 ppm) are added to polymerize the oligomer at 290° C. to a low viscosity prepolymer. After production of granules from this prepolymer, the granules are further condensed in a tumble dryer under high vacuum.

The resulting granules are melted in an electrically heated 30 mm extruder and heated at 310° C. The melt is added via a metering pump (2.4 cm$^3$ per revolution) in the desired quantity to a conventional, separately heated spinning apparatus, whereby the finest filter in the spinning filter pack is a 325 mesh wire net. Additional data is given in Tables I.1 and I.2.

Directly under the spinneret, the melt, formed into filaments, is blown laterally with as laminar an air stream as possible. The now-solidified filaments are combined after exiting the cooling zone, treated with a preparation, and then routed over two godet wheels, whereby the first godet wheel determines the withdrawal rate of the filament bundle. Neither godet wheel is heated. The filament bundle is then spooled. The spinning parameters are listed in Tables I. 1 and I.2, and the properties of the spun filament bundle in Tables II.1 and II.2. Subsequently, the filament bundles from tests 3 and 4 are drawn using different drawing rates. In the first case, a steam drawing frame with a length of 10 m is used, whereby drawing is carried out at 260° C. and a rate of 200 m/min. In the second case, drawing is conducted at a rate of 8.9 m/min, whereby the yarn is fed through a 1.2 m long tube maintained at 260° C.

The drawing parameters are listed in Table III and the properties of the drawn yarns in Table IV.

The density of the samples is determined at 23° C. using a Davenport gradient column containing a mixture of n-heptane and tetrachloromethane gradually decreasing in the downward direction. The density gradient is calibrated using calibrated suspended balls. Three yarn samples are moistened with n-heptane and inserted into the column. After 6 hours, the density is derived from the position of the individual samples in the column, and the average is calculated.

The double refraction is determined as follows:

10 filaments are dipped in dibutyl phthalate, positioned in parallel between microscope glasses, and positioned at an angle of 45° to crossed polarization devices of a microscope equipped with a sodium lamp ($\lambda$=0.5893 µm) and a Senarmont compensator. At the ends of the filaments, cut diagonally, the total difference in the phase $\Phi$ is determined by measuring the number of rings including the partial ring. For each filament, the double refraction is calculated using the equation $\Delta n = (\Phi/2\pi) \times (\lambda/D)$, where D is the filament diameter. In this case, too, the average of 10 measurements is taken.

To measure the strength, the yarns are first conditioned at 21° C. and 65% relative humidity. The titer of the yarns is determined by weighing three samples of 10 m length each and calculating the average. Using the Instron meter with standard clamps, 5 force/elongation curves are constructed at a length change rate of 100%/min, whereby the free clamping length of the yarn is 150 mm and the initial tension of the yarn is 5 mN/tex. The maximum determined force divided by the titer yields the breaking strength.

To determine the sound modulus, a piece of yarn is suspended at one end, drawn horizontally over a pair of rolls, and subjected at the other end to a load of 2 cN/tex. Between the two rolls, the yarn is positioned between two piezoelectric transducers for transmitting and receiving sound impulses at a frequency of 10 kHz for 60 µsec. An oscilloscope is used to adjust impulse triggering via a counter. The impulse transmission time through the yarn is measured five times at intervals of 15 seconds over a distance of 120 cm and subsequently over a distance of 40 cm. The distance difference (80 cm) divided by the average difference of the transit time yields the sound speed. The product of density and the square of the sound speed is the sound modulus.

TABLE I.1

| | Spinning Parameters | | | | | |
|---|---|---|---|---|---|---|
| Test No. | 1 | 2 | 3 | 4 | 5 | 6 |
| Melt flow index | 18.6 | 18.6 | 18.6 | 8.6 | 8.6 | 8.6 |
| Spinning temperature °C. | 310 | 310 | 310 | 312 | 312 | 312 |
| Spinneret hole diameter µm | 400 | 500 | 1000 | 1000 | 1000 | 1000 |
| Number of spinneret holes | 36 | 36 | 36 | 36 | 36 | 36 |
| Throughput per spinneret hole g/min | 1.0 | 1.1 | 1.1 | 1.1 | 2.1 | 2.1 |
| Draw-down | 593 | 834 | 3336 | 2085 | 1112 | 1335 |
| Air flow rate m/sec | 0.28 | 0.28 | 0.28 | 0.28 | 0.28 | 0.28 |
| Withdrawal rate m/min | 4000 | 4000 | 4000 | 2500 | 2500 | 3000 |
| $\Phi$ | 1.44 | 1.62 | 1.76 | 1.65 | 1.61 | 1.76 |

TABLE I.2

Spinning Parameters

| Test No. | 7 | 8 | 9 | 10 | 11 | 12 |
|---|---|---|---|---|---|---|
| Melt flow index | 8.6 | 8.6 | 8.6 | 8.6 | 8.6 | 7.1 |
| Spinning temperature °C. | 312 | 312 | 312 | 312 | 312 | 314 |
| Spinneret hole diameter μm | 1000 | 1000 | 1000 | 1000 | 1000 | 1000 |
| Number of spinneret holes | 36 | 36 | 36 | 36 | 36 | 36 |
| Throughput per spinneret hole g/min | 2.1 | 2.1 | 2.1 | 2.1 | 2.9 | 2.1 |
| Draw-down | 1557 | 1779 | 2002 | 2224 | 1620 | 1536 |
| Air flow rate m/sec | 0.28 | 0.28 | 0.28 | 0.28 | 0.28 | 0.1 |
| Withdrawal rate m/min | 3500 | 4000 | 4500 | 5000 | 5000 | 3500 |
| Φ | 1.77 | 1.77 | 1.77 | 1.76 | 1.75 | 1.77 |

TABLE III

Drawing Parameters

| Test No. | 3 | 3 | 3 | 3 | 4 |
|---|---|---|---|---|---|
| Run | a | b | c | d | e |
| Drawing 1: | 1.03 | 1.01 | 1.03 | 1.06 | 1.04 |
| Drawing Temperature °C. | 260 | 260 | 260 | 260 | 260 |
| Steam drawing frame | yes | — | — | — | — |
| Tube furnace | — | yes | yes | yes | yes |

TABLE II.1

Properties of Spun Yarn

| Test | 1 | 2 | 3 | 4 | 4 | 6 |
|---|---|---|---|---|---|---|
| Total titer dtex | 93 | 88 | 97 | 160 | 296 | 253 |
| Number of filaments | 36 | 36 | 36 | 36 | 36 | 36 |
| Tearing strength mN/tex | 547 | 460 | 590 | 460 | 429 | 450 |
| Elongation at tear % | 10.4 | 8.7 | 9.7 | 7.5 | 11.7 | 10.7 |
| Density kg/m³ | 1354.9 | 1353.1 | 1355.5 | 1358.0 | 1355.2 | 1355.7 |
| Double refraction Δn | 0.1948 | 0.1912 | 0.1885 | 0.1757 | 0.1789 | 0.1846 |
| Sound modulus GPa | 24.4 | 23.9 | 24.7 | 24.9 | 20.3 | 21.8 |
| DSC melting point °C. | 292 | 293 | 298 | 304 | 294 | 296 |
| Hot-air shrinkage at 190° C. % | 1.7 | 1.8 | 1.3 | 0.7 | 1.1 | 1.2 |
| Dimensional stability mN/tex % | 137 | 127 | 192 | 351 | 176 | 170 |

TABLE II.2

Properties of Spun Yarn

| Test No. | 7 | 8 | 9 | 10 | 11 | 12 |
|---|---|---|---|---|---|---|
| Total titer dtex | 222 | 195 | 167 | 134 | 216 | 199 |
| Number of filaments | 36 | 36 | 36 | 36 | 36 | 36 |
| Tearing strength mN/tex | 440 | 450 | 457 | 434 | 504 | 540 |
| Elongation at tear % | 9.2 | 8.3 | 7.3 | 6.8 | 8.3 | 11.1 |
| Density kg/m³ | 1357.2 | 1358.2 | 1359.1 | 1359.8 | 1360.2 | 1356.0 |
| Double refraction Δn | 0.1888 | 0.1899 | 0.1916 | 0.1936 | 0.2005 | 0.1848 |
| Sound modulus GPa | 23.0 | 24.9 | 25.8 | 27.8 | 26.5 | 23.2 |
| DSC melting point °C. | 298 | 299 | 301 | 304 | 298 | 296 |
| Hot-air shrinkage at 190° C. % | 1.0 | 1.1 | 1.1 | 1.3 | 1.3 | 1.5 |
| Dimensional stability mn/tex % | 215 | 216 | 233 | 201 | 193 | 164 |

TABLE IV

|  | Properties of Drawn Yarn | | | | |
|---|---|---|---|---|---|
| Test No. | 3 | 3 | 3 | 3 | 4 |
| Run | a | b | c | d | e |
| Tearing Strength mN/tex | 505 | 490 | 559 | 520 | 418 |
| Elongation at tear % | 4.4 | 6.1 | 4.3 | 2.4 | 2.7 |
| Density kg/m$^3$ | 1367.3 | 1370.3 | 1369.0 | 1367.9 | 1369.0 |
| Double refraction Δn | 0.2668 | 0.2647 | 0.2769 | 0.3054 | 0.2658 |
| Sound modulus GPa | 36.1 | 31.4 | 35.8 | 41.9 | 37.7 |
| DSC melting point °C. | 296 | 298 | 296 | 293 | 304 |
| Hot-air shrinkage at 190° C. % | 2.3 | 1.7 | 2.2 | 2.2 | 1.9 |
| Dimensional stability mN/tex % | 145 | 188 | 178 | 203 | 202 |

What is claimed is:

1. Method of producing a multifilament yarn, monofilament, or film, comprising melting a polymer, extruding the melted polymer from an extrusion device to form said multifilament yarn, monofilament or film, cooling to solidify said multifilament yarn, monofilament or film, withdrawing said multifilament yarn, monofilament or film at a rate of 500 to 10,000 m/min, blowing said multifilament yarn, monofilament or film extruded from the extrusion device with a fluid maintained at 10° to 15° C. at a rate of 0.1 to 1.0 m/sec and subjecting said multifilament yarn, monofilament or film to a draw-down B of 40 to 25,000 from the extrusion device output to a first withdrawal element, wherein said polymer comprises polyethylene naphthalate and has a melt-flow index C of 3 to 26.

2. Method in accordance with claim 1, wherein said polyethylene naphthalate is spun at a temperature T satisfying the following:

$$100e^{-0.46C}+300 \leq T \leq 100e^{-0.46C}+325.$$

3. Method in accordance with claim 1, wherein said polyethylene naphthalate has a melt flow index C of 6 to 20, said multifilament yarn, monofilament or film, solidified by cooling, is withdrawn at at a rate A of 500 to 8,000 m/min, and said multifilament yarn, monofilament or film are/is subjected to a draw-down B of 100 to 10,000 from the extrusion device output to the first withdrawal element.

4. Method in accordance with claim 3, wherein said polyethylene naphthalate has a melt flow index C of 7 to 15, the multifilament yarn, monofilament or film, solidified by cooling, is withdrawn at a rate A of 2,000 to 5,500 m/min, and said multifilament yarn, monofilament or film is subjected to a draw-down B of 500 to 8,000 from the extrusion device output to the first withdrawal element.

5. Method in accordance with claim 1, wherein said polyethylene naphthalate is spun at a temperature T satisfying the following:

$$100e^{-0.46C}+305 \leq T \leq 100e^{-0.46C}+318.$$

6. Method in accordance with claim 1, wherein said multifilament, monofilament or film is blown with a fluid maintained at 12° to 25° C.

7. Method in accordance with claim 6, wherein said multifilament yarn, monofilament or film extruded from the extrusion device is blown at a rate of 0.2 to 0.6 m/sec.

8. Method in accordance with claim 3, wherein a withdrawal rate A, said draw-down B, and said melt flow index C are chosen such that $\Phi > 1.15$, whereby $$\Phi = \left[ \frac{2.5}{1+e^{(-0.6*(\Psi+O_5))}} \right]$$

and $$\Psi = \frac{W_{13}}{1+e^{-0.6*[W_1*[\frac{(A-500)}{9500}*2-1]+W_2*[\frac{(B-40)}{29460}*2-1]+W_3*[\frac{(C-5)}{15}*2-1]+O_1]}} +$$

$$\frac{W_{14}}{1+e^{-0.6*[W_4*[\frac{(A-500)}{9500}*2-1]+W_5*[\frac{(B-40)}{29460}*2-1]+W_6*[\frac{(C-5)}{15}*2-1]+O_2]}} +$$

$$\frac{W_{15}}{1+e^{-0.6*[W_7*[\frac{(A-500)}{9500}*2-1]+W_8*[\frac{(B-40)}{29460}*2-1]+W_9*[\frac{(C-5)}{15}*2-1]+O_3]}} +$$

$$\frac{W_{16}}{1+e^{-0.6*[W_{10}*[\frac{(A-500)}{9500}*2-1]+W_{11}*[\frac{(B-40)}{29460}*2-1]+W_{12}*[\frac{(C-5)}{15}*2-1]+O_4]}}$$

and

-continued

| | | |
|---|---|---|
| $W_1 = 3.62416$ | $W_2 = -66.57265$ | $W_3 = -0.36305$ |
| $O_1 = -65.22670$ | $W_4 = -5.51435$ | $W_5 = -15.02366$ |
| $W_6 = -0.00704$ | $O_2 = -22.71156$ | $W_7 = 4.60509$ |
| $W_8 = -33.08694$ | $W_9 = -0.83813$ | $O_3 = -37.28374$ |
| $W_{10} = 43.44371$ | $W_{11} = 5.26325$ | $W_{12} = -5.66574$ |
| $O_4 = 29.64359$ | $W_{13} = -7.37680$ | $W_{14} = 7.17561$ |
| $W_{15} = 9.89252$ | $W_{16} = 3.02096$ | $O_5 = -1.59320$ |

9. Method in accordance with claim 1, wherein said extrusion device is a multi-hole spinneret.

10. Method in accordance with claim 1, wherein said multifilament yarn, monofilament, or film comprises at least 85% by weight polyethylene naphthalate.

11. Method in accordance with claim 1, wherein said multifilament yarn, monofilament, or film comprises at least two separately existing polymers at least one of which is polyethylene naphthalate, wherein said polyethylene naphthalate comprises at least 70% by weight of all polymers in said multifilament yarn, monofilament, or film.

12. Method of producing a multifilament yarn, monofilament, or film comprising polyethylene napthalate, with a strength of at least 400 mn/tex, wherein said multifilament yarn, monofilament, or film has a DSC melting point of at least 295° C., where the DSC melting point is measured on a sample quantity of 2.5 mg at a heating rare of 2.0° C. per min, comprising melting a polymer, extruding the melted polymer from an extrusion device to form said multifilament yarn, monofilament or film, cooling to solidify said multifilament yarn, monofilament or film, withdrawing said multifilament yarn, monofilament or film at a rate of 500 to 10,000 m/min, and subjecting said multifilament yarn, monofilament or film to a draw-down B of 40 to 25,000 from the extrusion device output to the first withdrawal element, wherein said polymer comprises polyethylene napthalate and has a melt-flow index C of 3 to 26.

* * * * *

UNITED STATES PATENT AND TRADEMARK OFFICE
CERTIFICATE OF CORRECTION

PATENT NO. : 5,618,480
DATED : April 8, 1997
INVENTOR(S) : Christiaan J. M. VAN DEN HEUVEL et al.

It is certified that error appears in the above-indentified patent and that said Letters Patent is hereby corrected as shown below:

On the cover page, in the Abstract, line 3, change "MN/tex" to --mN/tex--.

Col. 4, in the equation, change "29460" (all occurrences) to --24960--.

Col. 9, claim 3, line 42, delete "at" (first occurrence).

Col. 10, claim 3, line 19, change "are/is" to --is--.

Col. 10, in the equation, change "29460" (all occurrences) to --24960--.

Col. 12, claim 12, line 14, change "rare" to --rate--.

Signed and Sealed this

Fifth Day of August, 1997

Attest:

Attesting Officer

BRUCE LEHMAN

Commissioner of Patents and Trademarks